United States Patent
Xue et al.

(10) Patent No.: US 9,076,207 B1
(45) Date of Patent: Jul. 7, 2015

(54) IMAGE PROCESSING METHOD, SYSTEM AND ELECTRONIC DEVICE

(71) Applicants: Lenovo (Beijing) Limited, Beijing (CN); Beijing Lenovo Software Ltd., Beijing (CN)

(72) Inventors: Sukui Xue, Beijing (CN); Fan Zhang, Beijing (CN); Zhimin Xu, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 0 days.

(21) Appl. No.: 14/461,953

(22) Filed: Aug. 18, 2014

(30) Foreign Application Priority Data

Mar. 17, 2014 (CN) .......................... 2014 1 0098281

(51) Int. Cl.
  *G06K 9/40* (2006.01)
  *G06T 5/00* (2006.01)
  *G06T 5/50* (2006.01)
  *H04N 1/00* (2006.01)

(52) U.S. Cl.
  CPC . *G06T 5/003* (2013.01); *G06T 5/50* (2013.01); *H04N 1/00244* (2013.01); *G06T 2207/10004* (2013.01); *G06T 2207/20092* (2013.01); *G06T 2207/20201* (2013.01); *G06T 2207/20224* (2013.01)

(58) Field of Classification Search
  USPC ................. 382/255, 218, 221, 266, 269, 270; 348/240.2, 625; 345/107, 690; 358/1.9, 358/3.22, 447, 466; 375/240.16; 380/217
  See application file for complete search history.

(56) References Cited

U.S. PATENT DOCUMENTS

| | | | | |
|---|---|---|---|---|
| 6,404,924 | B1* | 6/2002 | Kondo | 382/224 |
| 6,625,327 | B1* | 9/2003 | Ohshima et al. | 382/270 |
| 7,555,043 | B2* | 6/2009 | Sato et al. | 375/240.16 |
| 8,842,139 | B2* | 9/2014 | Kanamori | 345/690 |

* cited by examiner

*Primary Examiner* — Anh Do
(74) *Attorney, Agent, or Firm* — Schwegman Lundberg & Woessner, P.A.

(57) ABSTRACT

The present disclosure provides an image processing method, system and electronic device. The method comprises: obtaining a first image; applying a first process to the first image to obtain a second image having a number of pixels smaller than a number of pixels in the first image; applying a second process to the second image to obtain a third image having an image quality higher than that of the second image; sending, upon detecting a first operation by a user, the first image to a server, such that the server applies a third process to the first image to obtain a fourth image having an image quality higher than that of the first image, the third process and the second process belonging to a same type of image process; and receiving the fourth image. The present invention avoids unnecessary waste of data traffic and saves the consumed time.

15 Claims, 4 Drawing Sheets

Fig. 4

IMAGE PROCESSING METHOD, SYSTEM AND ELECTRONIC DEVICE

CROSS-REFERENCE TO RELATED APPLICATION(S)

This application claims priority to the Chinese Application No. 201410098281.9, filed on Mar. 17, 2014, which is incorporated herein by reference in its entirety.

TECHNICAL FIELD

The present invention relates to image processing, and more particularly, to an image processing method, a system and an electronic device.

BACKGROUND

Users often use their terminals to take pictures in their daily lives. However, if a terminal is shaken when it is used to take a picture, the picture may be blurred and thus unclear. In this case, the picture can be optimized in order to improve its clarity.

Since such optimization is typically based on computationally demanding algorithms, if a terminal having a limited processing capability, such as a mobile phone, is used to optimize a picture, it will occupy a large amount of system resources in the terminal and it will be time consuming. Hence, in general the terminal will not be used for picture optimization. Instead, the picture can be uploaded to a server which optimizes the picture and then sends the optimized picture back to the terminal.

It costs time for the terminal to upload the picture and receive the optimized picture. Further, the user is not aware of the clarity of the optimized picture before the terminal uploads the picture. Thus, it is possible that the user is not satisfied with the clarity of the optimized picture, which unnecessarily wastes the user's time.

SUMMARY

The embodiments of the present invention provide image processing method, system and electronic device to solve the above problem.

According to a first aspect, an image processing method is provided. The method comprises: obtaining a first image; applying a first process to the first image to obtain a second image having a number of pixels smaller than a number of pixels in the first image; applying a second process to the second image to obtain a third image having an image quality higher than that of the second image; displaying the third image; sending, upon detecting a first operation by a user, the first image to a server, such that the server applies a third process to the first image to obtain a fourth image having an image quality higher than that of the first image, the third process and the second process belonging to a same type of image process; and receiving the fourth image. A first time length, which is a sum of a time length required for applying the first process to the first image and a time length required for applying the second process to the second image, is shorter than a second time length, which is a time interval between said sending of the first image to the server and said receiving of the fourth image.

According to a second aspect, an electronic device is provided. The electronic device comprises: a first image obtaining module configured to obtain a first image; a first processing module configured to apply a first process to the first image to obtain a second image having a number of pixels smaller than a number of pixels in the first image; a second processing module configured to apply a second process to the second image to obtain a third image having an image quality higher than that of the second image; an image display module configured to display the third image; a first image sending module configured to send, upon detecting a first operation by a user, the first image to a server, such that the server applies a third process to the first image to obtain a fourth image having an image quality higher than that of the first image, the third process and the second process belonging to a same type of image process; and a fourth image receiving module configured to receive the fourth image. A first time length, which is a sum of a time length required for applying the first process to the first image and a time length required for applying the second process to the second image, is shorter than a second time length, which is a time interval between said sending of the first image to the server and said receiving of the fourth image.

According to a third aspect, an image processing system is provided. The system comprises: an electronic device configured to: obtain a first image; apply a first process to the first image to obtain a second image having a number of pixels smaller than a number of pixels in the first image; apply a second process to the second image to obtain a third image having an image quality higher than that of the second image; display the third image; send, upon detecting a first operation by a user, the first image to a server, such that the server applies a third process to the first image to obtain a fourth image having an image quality higher than that of the first image, the third process and the second process belonging to a same type of image process; and receive the fourth image. The server is configured to receive the first image sent from the electronic device; apply the third process to the first image to obtain the fourth image; and send the fourth image back to the electronic device. The electronic device is further configured to receive the fourth image. A first time length, which is a sum of a time length required for the electronic device to apply the first process to the first image and a time length required for the electronic device to apply the second process to the second image, is shorter than a second time length, which is a time interval between the electronic device sending the first image to the server and the electronic device receiving the fourth image.

The solutions according to the embodiments of the present invention have the following technical effects. Before the first image is sent to the server, the first process is applied to the first image to obtain the second image, so as to reduce the number of pixels of the first image. Then, the second process is applied to the second image having the reduced number of pixels to obtain the third image, so as to achieve an improved processing speed. The third image is then displayed, such that the user can know in advance the image quality of the optimized first image. When the first operation by the user is detected, the first image is sent to the server. When the first operation by the user is not detected, the first image will not be sent to the server, thereby avoiding unnecessary waste of data traffic. Further, the sum of the time length required for applying the first process to the first image and the time length required for applying the second process to the second image is shorter than the time interval between the sending of the first image to the server and the receiving of the fourth image, which can save the consumed time.

BRIEF DESCRIPTION OF THE DRAWINGS

In order to illustrate the solutions according to the embodiments of the present application clearly, the figures used for description of the embodiments will be introduced briefly here. It is apparent to those skilled in the art that the figures described below only illustrate some embodiments of the present invention and other figures can be obtained from these figures without applying any inventive skills.

DETAILED DESCRIPTION OF THE EMBODIMENTS

In the following, the solutions according to the embodiments of the present invention will be described clearly and fully with reference to the figures. Obviously, the embodiments described below are only some, rather than all, of the embodiments. Starting from the embodiments of the present invention, those skilled in the art can obtain other embodiments with applying any inventive skills. All these embodiments are to be encompassed by the scope of the present invention.

Figure 1:
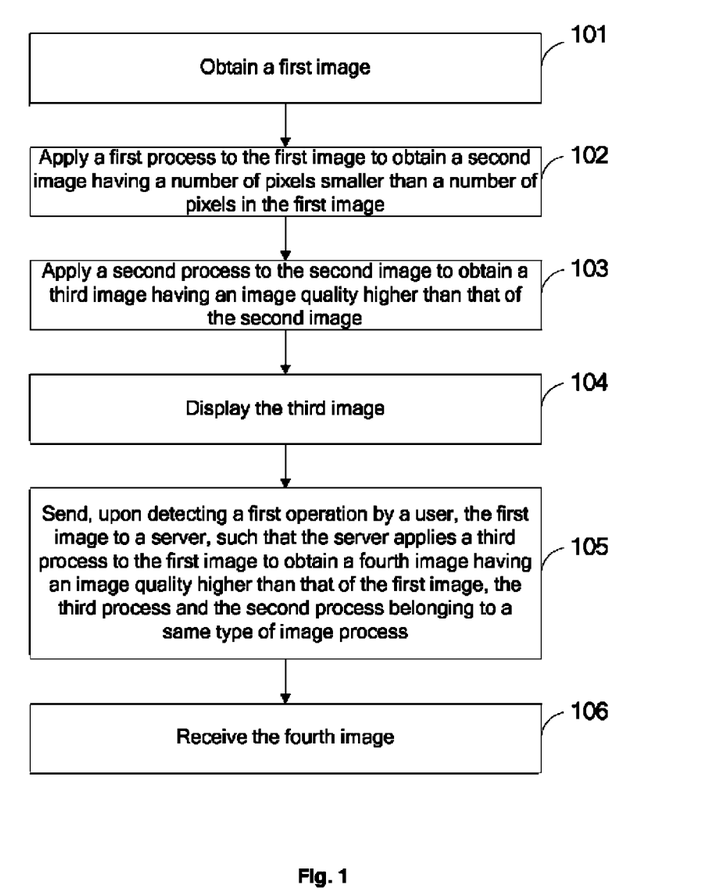
FIG. 1 is a flowchart illustrating an image processing method according to an embodiment of the present invention.

FIG. 1 is a flowchart illustrating an image processing method according to an embodiment of the present invention. The method can be applied in an electronic device having an image processing function and an image displaying function. The electronic device can be e.g., a smart phone, a tablet computer or a wearable device. As shown in FIG. 1, the method includes the following steps.

At step 101, a first image is obtained.

At step 102, a first process is applied to the first image to obtain a second image having a number of pixels smaller than the number of pixels in the first image.

At step 103, a second process is applied to the second image to obtain a third image having an image quality higher than that of the second image.

At step 104, the third image is displayed.

At step 105, upon detecting a first operation by a user, the first image is sent to a server, such that the server applies a third process to the first image to obtain a fourth image having an image quality higher than that of the first image. The third process and the second process belong to a same type of image process.

In the embodiment of the present invention, the electronic device displays the third image. When the user is satisfied with the image quality of the third image, he/she can trigger the first operation. Upon detecting the first operation by the user, the electronic device determines that the user is satisfied with the image quality of the third image and sends the first image to the server. If the electronic device fails to detect the first operation by the user, it does not send the first image. That is, before the first image is formally optimized by the server, it is pre-processed by the electronic device. The first image is sent to the server for optimization only when the electronic device determines that the user is satisfied with the pre-processed image. The first image will not be sent to the server when the electronic device has not determined that the user is satisfied with the pre-processed image.

Further, upon receiving the first image, the server applies the third process to the first image. Since the server has a higher processing capability than the electronic device, the time length required for the server to apply the third process to the first image is shorter than the time length required for the electronic device to apply the third process to the first image. When compared with the scenario where the electronic device applies the third process to the first image, the consumed time can be saved.

At step 106, the fourth image is received.

Here, a first time length, which is a sum of a time length required for applying the first process to the first image and a time length required for applying the second process to the second image, is shorter than a second time length, which is a time interval between the sending of the first image to the server and the receiving of the fourth image.

With the method according to the embodiment of the present invention, before the first image is sent to the server, the first process is applied to the first image to obtain the second image, so as to reduce the number of pixels of the first image. Then, the second process is applied to the second image having the reduced to number of pixels to obtain the third image, so as to achieve an improved processing speed. The third image is then displayed, such that the user can know in advance the image quality of the optimized first image. When the first operation by the user is detected, the first image is sent to the server. When the first operation by the user is not detected, the first image will not be sent to the server, thereby avoiding unnecessary waste of data traffic. Further, the sum of the time length required for applying the first process to the first image and the time length required for applying the second process to the second image is shorter than the time interval between the sending of the first image to the server and the receiving of the fourth image, which can save the consumed time.

Optionally, the method further includes, subsequent to said displaying of the third image: deleting, upon detecting a second operation by the user, the second image and the third image.

Optionally, said applying the first process to the first image to obtain the second image includes: selecting a part of the first image as the second image.

Optionally, said applying the first process to the first image to obtain the second image includes: down-sampling the first image to obtain the second image.

Optionally, the method further includes: determining whether the image quality of the first image meets an image quality requirement. Said applying the first process to the first image is performed when the image quality of the first image does not meet the image quality requirement.

Optionally, said applying the first process to the first image when the image quality of the first image does not meet the image quality requirement includes: extracting from the first image an image having an image quality that does not meet the image quality requirement as the second image when the image quality of the first image does not meet the image quality requirement.

Optionally, said applying the second process to the second image to obtain the third image includes: applying a deblurring process to the second image to obtain the third image.

All the above optional solutions can be combined arbitrarily to obtain optional embodiments of the present invention and the description thereof will be omitted here.

Figure 2:
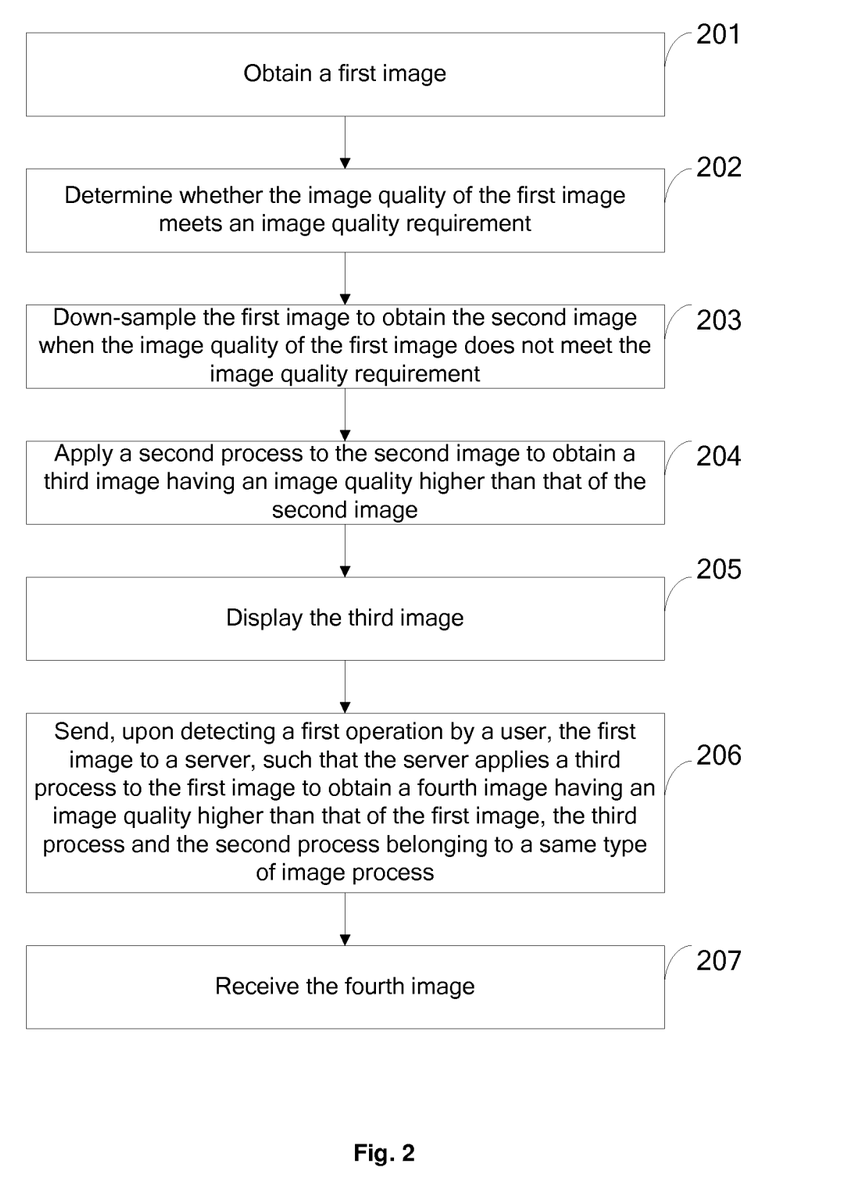
FIG. 2 is a flowchart illustrating an image processing method according to an embodiment of the present invention.

FIG. 2 is a flowchart illustrating an image processing method according to an embodiment of the present invention. The method can be applied in an electronic device. As shown in FIG. 2, the method includes the following steps.

At step 201, a first image is obtained.

Here, the first image can be a taken picture or a snapshot of any picture in a video. The present invention is not limited to any specific first image.

Optionally, when the electronic device detects an operation by the user to issue a picture, a first image associated with the operation to issue a picture can be obtained. Alternatively, when the electronic device detects an operation to take a picture, the taken picture can be obtained as the first image.

At step 202, it is determined whether the image quality of the first image meets an image quality requirement.

In the embodiment of the present invention, an image quality requirement can be set in advance. It is determined whether the image quality of the first image meets the image quality requirement. When the image quality of the first image meets the image quality requirement, which indicates that the user might be satisfied with the image quality of the first image, the electronic device does not need to send the first image to the server. However, when the image quality of the first image does not meet the image quality requirement, which indicates that the user might not be satisfied with the image quality of the first image, the electronic device needs to send the first image to the server for processing.

Optionally, the image quality requirement may include a clarity threshold. The clarity of the first image can be obtained and it can be determined whether the clarity of the first image is higher than the clarity threshold. When the clarity of the first image is higher than the clarity threshold, it is determined that the image quality of the first image meets the image quality requirement. When the clarity of the first image is not higher than the clarity threshold, it is determined that the image quality of the first image does not meet the image quality requirement.

Further, as an alternative, a blur determination algorithm can be utilized to determine whether the first image is blurry. In particular, a grayscale map of the first image can be obtained and it can be determined from the grayscale distribution in the grayscale map whether the first image is blurry. When the grayscale map has a wide grayscale distribution and the low grayscale points are adjacent, or close, to the high grayscale points, it is determined that the first image is blurry.

At step 203, when the image quality of the first image does not meet the image quality requirement, the first image is down-sampled to obtain the second image.

When the image quality of the first image does not meet the image quality requirement, if the electronic device directly sends the first image to the server and the server processes the first image and sends the processed image back to the electronic device, the user may not be satisfied with the processed image, which wastes data traffic and time. Hence, in order to avoid such waste of data traffic and time, instead of sending the first image directly to the server, the electronic device pre-processes the first image to allow the user to known in advance the image quality of the processed first image. Upon detecting a first operation by the user to determine that the user has confirmed to send the first image, it is determined that the user is satisfied with the image quality of the processed first image and then the first image can be sent to the server.

To process the first image, the electronic device first applies a first process to the first image to obtain the second image, such that the number of pixels in the second image is smaller than the number of pixels in the first image. By applying a second process to the second image having a reduced number of pixels, the processing speed of the second process can be improved.

It is to be noted that, while the first image is down-sampled to obtain the second image in the step 203 as an example, the step 203 can be replaced with any of steps 203-1 and 203-2 as described below.

At step 203-1, when the image quality of the first image does not meet the image quality requirement, a part of the first image is selected as the second image.

The electronic device can select a part of the first image as the second image, such that the number of pixels in the second image is smaller than the number of pixels in the first image. Subsequently when the electronic device applies a second process to the second image to obtain a third image, the image quality of the third image can reflect the image quality of a fourth image which will be obtained by the server processing the first image. When the user is satisfied with the image quality of the third image, it can be considered that the user is likely to be satisfied with the image quality of the fourth image.

At step 203-2, when the image quality of the first image does not meet the image quality requirement, an image having an image quality that does not meet the image quality requirement is extracted from the first image as the second image.

In the embodiment of the present invention, the first image can be divided into a part having an image quality that meets the image quality requirement and a part having an image quality that does not meet the image quality requirement. When the overall image quality of the first image does not meet the image quality requirement, an image having an image quality that does not meet the image quality requirement can be extracted from the first image as the second image, such that the number of pixels in the second image is smaller than the number of pixels in the first image. Subsequently when the electronic device applies a second process to the second image to obtain a third image, if the user is satisfied with the image quality of the third image, it can be considered that the user is likely to be satisfied with the image quality of the fourth image.

At step 204, a second process is applied to the second image to obtain a third image having an image quality higher than that of the second image.

The electronic device applies the second process to the second image to obtain the third image, so as to improve the image quality of the second image. Since the second process and the third process that will be applied by the server to the first image belong to the same type of image process, the third image can reflect the image quality of the fourth image.

Optionally, the step 204 may include one or more of the following. The electronic device may apply a deblurring process to the second image using a deblurring algorithm to obtain the third image. Alternatively, the electronic device may apply a noise reduction process to the second image to obtain the third image. Alternatively, the electronic device may apply a contrast adjustment to the second image to obtain the third image. Alternatively, the electronic device may apply a special effect process to the second image, e.g., adding a picture frame to the second image or rotating the second image, to obtain the third image.

At step 205, the third image is displayed.

The electronic device obtains the third image by applying the first and second processes to the first image and displays the third image, such that the user can view the third image and know in advance from the third image the image quality of the first image after being processed by the server.

At step 206, upon detecting a first operation by a user, the first image is sent to a server, such that the server applies a third process to the first image to obtain a fourth image having an image quality higher than that of the first image. The third process and the second process belong to a same type of image process.

Here, the first operation can be an operation by the user to click or double-click the third image and the present invention is not limited to this.

Upon detecting the first operation by the user, the electronic device determines that the user is satisfied with the image quality of the third image and sends the first image to the server, such that the server applies a third process to the first image to obtain a fourth image having an image quality higher than that of the first image. The third process and the second process belong to the same type of image process.

Based on the alternatives provided in connection with the step 204, the step in which the server processes the first image to obtain the fourth image may include one or more of the following. The server may apply a deblurring process to the first image using a deblurring algorithm to obtain the fourth image. Alternatively, the server may apply a noise reduction process to the first image to obtain the fourth image. Alternatively, the server may apply a contrast adjustment to the first image to obtain the fourth image. Alternatively, the server may apply a special effect process to the first image to obtain the fourth image.

In another embodiment of the present invention, the step 206 can be replaced with a step of deleting the second image and the third image upon detecting a second operation by the user.

Here, the second operation is different from the first operation. It can be an operation by the user to exit from an interface for displaying the third image or to long press the third image. The present invention is not limited to this.

Upon detecting the second operation by the user, the electronic device determines that the user is not satisfied with the image quality of the third image, i.e., the user is not satisfied with the image quality of the processed first image. In this case, the electronic device deletes the second and third images and does not send the first image to the server, which saves data traffic and time.

At step 204, the fourth image is received.

The server sends the resulting fourth image back to the electronic device. The electronic device displays the fourth image, such that the fourth image can be viewed by the user. After the fourth image is received, it can be stored in the electronic device.

In the embodiment of the present invention, a sum of a time length required for applying the first process to the first image and a time length required for applying the second process to the second image, i.e., the time length required for the steps 203 and 204 in the embodiment of the present invention, is referred to as a first time length. A time interval between the sending of the first image to the server and the receiving of the fourth image, i.e., the time length required for the steps 206 and 207 in the embodiment of the present invention, is referred to as a second time length. The first time length is shorter than the second time length. That is, the time length required for the electronic device to pre-process the first image is shorter than the time length required for the server to process the first image. In this way, when the user is not satisfied with the image quality of the third image, only the first time length is consumed and the second time length will not be consumed, which saves time.

With the method according to the embodiment of the present invention, before the first image is sent to the server, the first process is applied to the first image to obtain the second image, so as to reduce the number of pixels of the first image. Then, the second process is applied to the second image having the reduced number of pixels to obtain the third image, so as to achieve an improved processing speed. The third image is then displayed, such that the user can know in advance the image quality of the optimized first image. When the first operation by the user is detected, the first image is sent to the server. When the first operation by the user is not detected, the first image will not be sent to the server, thereby avoiding unnecessary waste of data traffic. Further, the sum of the time length required for applying the first process to the first image and the time length required for applying the second process to the second image is shorter than the time interval between the sending of the first image to the server and the receiving of the fourth image, which can save the consumed time.

Figure 3:
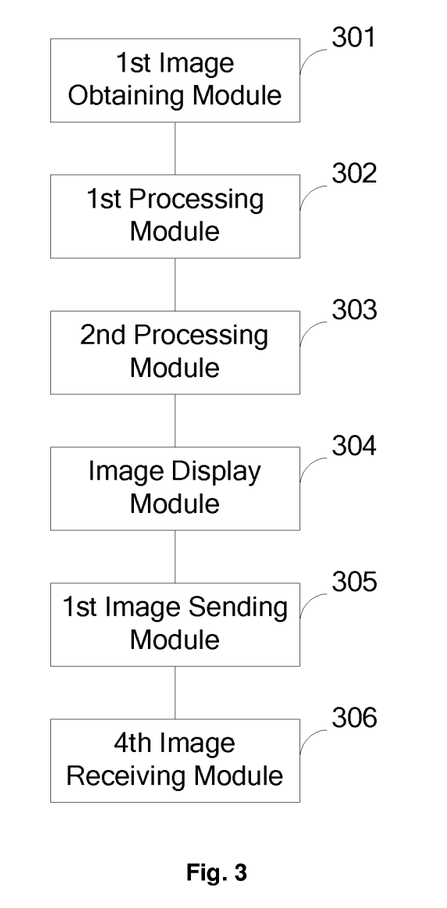
FIG. 3 is a schematic diagram showing a structure of an electronic device according to an embodiment of the present invention.

FIG. 3 is a schematic diagram showing a structure of an electronic device according to an embodiment of the present invention. Referring to FIG. 3, the electronic device includes the following modules.

A first image obtaining module 301 is configured to obtain a first image.

A first processing module 302 is configured to apply a first process to the first image to obtain a second image having a number of pixels smaller than a number of pixels in the first image.

A second processing module 303 is configured to apply a second process to the second image to obtain a third image having an image quality higher than that of the second image.

An image display module 304 is configured to display the third image.

A first image sending module 305 is configured to send, upon detecting a first operation by a user, the first image to a server, such that the server applies a third process to the first image to obtain a fourth image having an image quality higher than that of the first image. The third process and the second process belong to a same type of image process.

A fourth image receiving module 306 is configured to receive the fourth image.

A first time length, which is a sum of a time length required for applying the first process to the first image and a time length required for applying the second process to the second image, is shorter than a second time length, which is a time interval between the sending of the first image to the server and the receiving of the fourth image.

With the electronic device according to the embodiment of the present invention, before the first image is sent to the server, the first process is applied to the first image to obtain the second image, so as to reduce the number of pixels of the first image. Then, the second process is applied to the second image having the reduced number of pixels to obtain the third image, so as to achieve an improved processing speed. The third image is then displayed, such that the user can know in advance the image quality of the optimized first image. When the first operation by the user is detected, the first image is sent to the server. When the first operation by the user is not detected, the first image will not be sent to the server, thereby avoiding unnecessary waste of data traffic. Further, the sum of the time length required for applying the first process to the first image and the time length required for applying the second process to the second image is shorter than the time interval between the sending of the first image to the server and the receiving of the fourth image, which can save the consumed time.

Optionally, the electronic device further includes an image deleting module configured to delete, upon detecting a second operation by the user, the second image and the third image.

Optionally, the first processing module 302 is configured to select a part of the first image as the second image.

Optionally, the first processing module 302 is configured to down-sample the first image to obtain the second image.

Optionally, the first processing module 302 includes: an image quality determining unit configured to determine whether the image quality of the first image meets an image quality requirement and a first process applying unit configured to apply the first process to the first image when the image quality of the first image does not meet the image quality requirement.

Optionally, the first process applying unit is configured to extract from the first image an image having an image quality that does not meet the image quality requirement as the second image when the image quality of the first image does not meet the image quality requirement.

Optionally, the second processing module 303 is configured to apply a deblurring process to the second image to obtain the third image.

All the above optional solutions can be combined arbitrarily to obtain optional embodiments of the present invention and the description thereof will be omitted here.

It is to be noted that the electronic device according to the above embodiment has been described with reference to an example in which the electronic device is divided into individual functional modules for processing the image. In practice, the above functions can be assigned to different functional modules as desired. That is, the internal structure of the apparatus can be divided into different functional modules for achieving part or all of the above described functions. In addition, the electronic device according to the above embodiment and the image processing method belong to the same concept. For details of the electronic device, reference can be made to the embodiment of the method and the description thereof will be omitted here.

Figure 4:
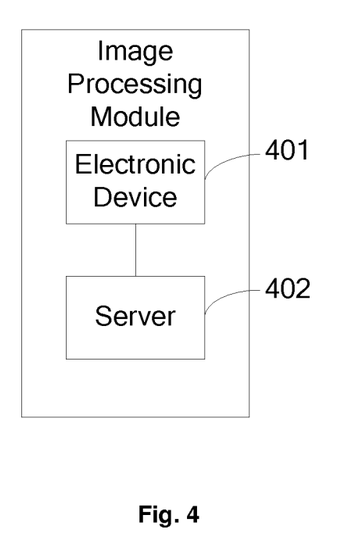
FIG. 4 is a schematic diagram showing a structure of an image processing system according to an embodiment of the present invention.

FIG. 4 is a schematic diagram showing a structure of an image processing system according to an embodiment of the present invention. Referring to FIG. 4, the system includes an electronic device 401 and a server 402.

The electronic device 401 is configured to: obtain a first image; apply a first process to the first image to obtain a second image having a number of pixels smaller than a number of pixels in the first image; apply a second process to the second image to obtain a third image having an image quality higher than that of the second image; display the third image; send, upon detecting a first operation by a user, the first image to a server, such that the server applies a third process to the first image to obtain a fourth image having an image quality higher than that of the first image, the third process and the second process belonging to a same type of image process; and receive the fourth image.

The server 402 is configured to: receive the first image sent from the electronic device; apply the third process to the first image to obtain the fourth image; and send the fourth image back to the electronic device.

The electronic device 401 is further configured to: receive the fourth image.

A first time length, which is a sum of a time length required for the electronic device 401 to apply the first process to the first image and a time length required for the electronic device 401 to apply the second process to the second image, is shorter than a second time length, which is a time interval between the electronic device 401 sending the first image to the server 402 and the electronic device 401 receiving the fourth image.

Optionally, the electronic device 401 can be configured to delete, upon detecting a second operation by the user, the second image and the third image.

Optionally, the electronic device 401 can be configured to select a part of the first image as the second image.

Optionally, the electronic device 401 can be configured to down-sample the first image to obtain the second image.

Optionally, the electronic device 401 can be configured to determine whether the image quality of the first image meets an image quality requirement and apply the first process to the first image when the image quality of the first image does not meet the image quality requirement.

Optionally, the electronic device 401 can be configured to extract from the first image an image having an image quality that does not meet the image quality requirement as the second image when the image quality of the first image does not meet the image quality requirement.

Optionally, the electronic device 401 can be configured to apply a deblurring process to the second image to obtain the third image.

It can be appreciated by those skilled in the art that the all or part of the steps described in the above embodiments can be implemented in hardware, possibly following instructions by a program. Such program can be stored in a computer readable storage medium which can be a Read Only Memory (ROM), a magnetic disk or an optical disc.

The present invention is not limited to the preferred embodiments as described above. Any modifications, equivalents or improvements that can be made without departing from the spirit and principle of the present invention are to be encompassed by the scope of the present invention.

What is claimed is:

1. An image processing method applied in an electronic device, comprising:
    obtaining a first image;
    applying a first process to the first image to obtain a second image having a number of pixels smaller than a number of pixels in the first image;
    applying a second process to the second image to obtain a third image having an image quality higher than that of the second image;
    displaying the third image;
    sending, upon detecting a first operation by a user, the first image to a server, such that the server applies a third process to the first image to obtain a fourth image having an image quality higher than that of the first image, the third process and the second process belonging to a same type of image process; and
    receiving the fourth image;
    wherein a first time length, which is a sum of a time length required for applying the first process to the first image and a time length required for applying the second process to the second image, is shorter than a second time length, which is a time interval between said sending of the first image to the server and said receiving of the fourth image.

2. The method of claim 1, further comprising, subsequent to said displaying of the third image:
    deleting, upon detecting a second operation by the user, the second image and the third image.

3. The method of claim 1, wherein said applying the first process to the first image to obtain the second image comprises:
    selecting a part of the first image as the second image.

4. The method of claim 1, wherein said applying the first process to the first image to obtain the second image comprises:
    down-sampling the first image to obtain the second image.

5. The method of claim 1, further comprising:
determining whether the image quality of the first image meets an image quality requirement,
wherein said applying the first process to the first image is performed when the image quality of the first image does not meet the image quality requirement.

6. The method of claim 5, wherein said applying the first process to the first image when the image quality of the first image does not meet the image quality requirement comprises:
extracting from the first image an image having an image quality that does not meet the image quality requirement as the second image when the image quality of the first image does not meet the image quality requirement.

7. The method of claim 1, wherein said applying the second process to the second image to obtain the third image comprises:
applying a deblurring process to the second image to obtain the third image.

8. An electronic device, comprising:
a first image obtaining module configured to obtain a first image;
a first processing module configured to apply a first process to the first image to obtain a second image having a number of pixels smaller than a number of pixels in the first image;
a second processing module configured to apply a second process to the second image to obtain a third image having an image quality higher than that of the second image;
an image display module configured to display the third image;
a first image sending module configured to send, upon detecting a first operation by a user, the first image to a server, such that the server applies a third process to the first image to obtain a fourth image having an image quality higher than that of the first image, the third process and the second process belonging to a same type of image process; and
a fourth image receiving module configured to receive the fourth image;
wherein a first time length, which is a sum of a time length required for applying the first process to the first image and a time length required for applying the second process to the second image, is shorter than a second time length, which is a time interval between said sending of the first image to the server and said receiving of the fourth image.

9. The electronic device of claim 8, further comprising:
an image deleting module configured to delete, upon detecting a second operation by the user, the second image and the third image.

10. The electronic device of claim 8, wherein the first processing module is configured to select a part of the first image as the second image.

11. The electronic device of claim 8, wherein the first processing module is configured to down-sample the first image to obtain the second image.

12. The electronic device of claim 8, wherein the first processing module comprises:
an image quality determining unit configured to determine whether the image quality of the first image meets an image quality requirement,
a first process applying unit configured to apply the first process to the first image when the image quality of the first image does not meet the image quality requirement.

13. The electronic device of claim 12, wherein the first process applying unit is configured to extract from the first image an image having an image quality that does not meet the image quality requirement as the second image when the image quality of the first image does not meet the image quality requirement.

14. The electronic device of claim 8, wherein the second processing module is configured to apply a deblurring process to the second image to obtain the third image.

15. An image processing system, comprising:
an electronic device configured to:
obtain a first image;
apply a first process to the first image to obtain a second image having a number of pixels smaller than a number of pixels in the first image;
apply a second process to the second image to obtain a third image having an image quality higher than that of the second image;
display the third image;
send, upon detecting a first operation by a user, the first image to a server, such that the server applies a third process to the first image to obtain a fourth image having an image quality higher than that of the first image, the third process and the second process belonging to a same type of image process; and
receive the fourth image, and
the server configured to:
receive the first image sent from the electronic device;
apply the third process to the first image to obtain the fourth image; and
send the fourth image back to the electronic device,
the electronic device being further configured to:
receive the fourth image,
wherein a first time length, which is a sum of a time length required for the electronic device to apply the first process to the first image and a time length required for the electronic device to apply the second process to the second image, is shorter than a second time length, which is a time interval between the electronic device sending the first image to the server and the electronic device receiving the fourth image.

* * * * *